United States Patent
Hermanski

(10) Patent No.: US 10,030,778 B2
(45) Date of Patent: Jul. 24, 2018

(54) SEALING SLEEVE FOR A ROTARY JOINT COUPLING

(71) Applicant: ContiTech Vibration Control GmbH, Hannover (DE)

(72) Inventor: Uwe Hermanski, Zernien (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 14/887,032

(22) Filed: Oct. 19, 2015

(65) Prior Publication Data

US 2016/0040785 A1 Feb. 11, 2016

Related U.S. Application Data

(63) Continuation of application No. PCT/EP2014/052570, filed on Feb. 11, 2014.

(30) Foreign Application Priority Data

Apr. 19, 2013 (DE) .................. 10 2013 103 977

(51) Int. Cl.
*F16J 15/52* (2006.01)
*F16J 3/04* (2006.01)

(52) U.S. Cl.
CPC .............. *F16J 15/52* (2013.01); *F16J 3/042* (2013.01); *F16J 3/046* (2013.01)

(58) Field of Classification Search
CPC .. F16J 15/52; F16J 15/36; F16J 15/363; F16J 3/041

(Continued)

(56) References Cited

U.S. PATENT DOCUMENTS 3,106,414 A * 10/1963 Peters ........................ F16J 3/02
285/226
3,248,955 A * 5/1966 Templeton ............. B60G 7/005
277/635

(Continued)

FOREIGN PATENT DOCUMENTS

DE    10 2007 015 073 A1    7/2008
WO    01/88399 A1    11/2001
WO    2008/037874 A2    4/2008

OTHER PUBLICATIONS

International Search Report dated Apr. 22, 2014 of international application PCT/EP2014/052570 on which this application is based.

*Primary Examiner* — Kristina R Fulton
*Assistant Examiner* — L. Susmitha Koneru
(74) *Attorney, Agent, or Firm* — Walter Ottesen, P.A.

(57) ABSTRACT

A sealing sleeve seals off a shaft rotating in a rotary joint coupling having a joint outer part and a coupling end facing toward the sealing sleeve. The sealing sleeve includes a first end and a second end. The second end has a larger diameter than the first end and is connected seal tight with the joint outer part and the first end is connected seal tight with the shaft. A first section of the sealing sleeve extends from a lip seal and is in contact engagement with the shaft. The first section has an inner periphery and a plurality of inner grooves distributed over the inner periphery. A second section extends from the first section at the coupling end. The second section has an inner periphery and sawtooth-shaped rib-like projections aligned toward the shaft and the rib-like projections have tips in contact engagement with the shaft.

7 Claims, 4 Drawing Sheets

(58) Field of Classification Search
USPC .......................... 277/634, 635, 636; 464/173
See application file for complete search history.

(56) References Cited

U.S. PATENT DOCUMENTS

| | | | | |
|---|---|---|---|---|
| 4,423,526 A | * | 1/1984 | Izzi, Sr. ................ | E03D 11/16 277/606 |
| 4,852,891 A | * | 8/1989 | Sugiura ................ | B29C 49/063 264/177.1 |
| 5,024,451 A | * | 6/1991 | Borowski ............ | F16J 15/4474 277/347 |
| 5,027,665 A | * | 7/1991 | Hayward ................ | F16J 3/045 138/109 |
| 5,478,091 A | * | 12/1995 | Gardner ................ | F16C 1/107 270/1.01 |
| 6,179,717 B1 | | 1/2001 | Schwaerzler | |
| 6,210,103 B1 | * | 4/2001 | Ramsay ................ | F16C 25/02 277/318 |
| 7,354,349 B2 | | 4/2008 | Wette | |
| 7,677,982 B2 | * | 3/2010 | Compau ................ | F16D 3/845 277/928 |
| 7,695,373 B1 | * | 4/2010 | Billett ................ | F16J 3/042 277/636 |
| 7,699,710 B2 | | 4/2010 | Wette | |
| 2008/0070706 A1 | | 3/2008 | Compau et al. | |
| 2008/0231003 A1 | * | 9/2008 | Moriyama .......... | B60R 13/0846 277/636 |
| 2012/0309547 A1 | | 12/2012 | Terasaka et al. | |

\* cited by examiner

SEALING SLEEVE FOR A ROTARY JOINT COUPLING

CROSS REFERENCE TO RELATED APPLICATIONS

This application is a continuation application of international patent application PCT/EP32014/052570, filed Feb. 11, 2014, designating the United States and claiming priority from German application 10 2013 103 977.4, filed Apr. 19, 2013, and the entire content of both applications is incorporated herein by reference.

FIELD OF THE INVENTION

The invention relates to a sealing sleeve in the form of a rolling bellows which can be moved in a stroke and angular manner for sealing rotary joint couplings of rotating shafts, in particular cardan shafts, wherein the sealing sleeve is connected in a sealing manner to the outer joint member with the end thereof having the larger diameter and is connected in a sealing manner to the shaft with the end having the smaller diameter.

BACKGROUND OF THE INVENTION

Such sealing sleeves on a rotary joint coupling, that is, on a rotating drive joint, on the one hand, have to retain the grease filling in the joint, on the other hand, have to prevent the introduction of dirt into the joint and also withstand volume changes of the space enclosed by the sealing sleeve in a manner without damage. In this instance, the sealing sleeve also has to perform these tasks in a reliable manner with angular positions of the rotary joint coupling, that is, in the event of an angular position between the shaft and the outer joint member even when the sealing sleeve by means of rotation of the rotary joint coupling is subjected to a rapidly changing, continuously oscillating flexion movement. With a rotary joint coupling, for example, in a cardan shaft of a passenger vehicle, high speeds, relatively large angular positions and consequently a powerful alternating flexural stress for the sealing sleeve can be produced.

WO 01/88399 A1 discloses a sealing sleeve in the form of a rolling bellows for sealing a rotary joint, having a first collar having a larger diameter for fixing on an outer joint member and a second collar having a smaller diameter for fixing on an inner joint member or shaft which is connected thereto. The rolling bellows has a partially double wall which connects the collars.

Although the influence of the alternating flexural stress at high speeds and large angular positions is thereby kept low, a particular sealing or volume tolerance is not pronounced.

U.S. Pat. Nos. 7,354,349 and 7,699,710 disclose a sealing sleeve in the manner of a rolling bellows, in which the wall portion, which is located between the larger collar and the smaller collar, forms at least one axially open annular fold with peripherally distributed divisions in the convex curvature. Although this is used for better release from the mold during production, it does not lead to particularly improved properties with respect to the sealing.

SUMMARY OF THE INVENTION

An object of the invention is to provide a sealing sleeve for a rotary joint coupling, which sleeve is simple to produce and in which, in spite of a rapidly changing, continuously oscillating flexion movement, increased sealing with respect to grease which is discharged from the rotary joint coupling and reliable sealing with respect to dirt which is introduced is achieved.

The sealing sleeve of the invention is in the form of a stroke-movable and angle-movable rolling bellows for sealing off a shaft rotating in a rotary joint coupling having a joint outer part and a coupling end facing toward the sealing sleeve. The sealing sleeve includes: a first end having a first diameter and a second end having a second diameter greater than the first diameter; the second end being connected seal tight with the joint outer part and the first end being connected seal tight with the shaft. Starting from the first end and continuing to the second end, the sealing sleeve further includes: a lip seal in contact engagement with the outer periphery of the shaft; a first section at the coupling end and the first section extending from the lip seal and being in contact engagement with the shaft; the first section having an inner periphery and a plurality of inner grooves distributed over the inner periphery; the inner grooves being open toward the shaft; a second section extending from the first section at the coupling end; the second section having an inner periphery and sawtooth-shaped rib-like projections aligned toward the shaft; and, the rib-like projections having tips in contact engagement with the shaft.

Accordingly, the sealing sleeve, at the end having the smaller diameter, and starting from this end, includes the following:

- a lip seal which adjoins the periphery of the shaft;
- a first section which adjoins the lip seal at the coupling side and which adjoins the shaft and which is provided with inner grooves which are arranged so as to be distributed over the inner periphery and which are open in the direction toward the shaft; and,
- a second section which adjoins the first section at the coupling side and which has saw-tooth-like projections or ribs which extend on the inner periphery thereof and which are orientated toward the shaft and whose tips adjoin the outer side of the shaft.

Such an embodiment according to the invention leads, on the one hand, as a result of the inner grooves or "channels" which are arranged so as to be distributed over the inner periphery, to reliable aeration and venting of the rotary joint coupling which is encapsulated by the sealing sleeve, in spite of the generally close contact engagement of the first section on the shaft. The axially extending channels, in the event of angularity and volume change of the encapsulated regions, which change is produced by the flexion movement or lifting movement of the sleeve, also ensure that air can be discharged, whilst at the same time the peripheral sealing lip reliably prevents the introduction of dirt and moisture. Furthermore, the second section, which has saw-tooth-like projections or ribs which extend on the inner periphery thereof and which are orientated toward the shaft and whose tips are in contact engagement with the outer side of the shaft, produces a labyrinth-like seal which prevents the discharge of grease from the encapsulated regions so that, even in the case of, the lifting and rotation movements, no grease or lubricant from the rotary joint coupling can be introduced in the direction of the small collar.

An advantageous embodiment involves the lip seal being constructed so as to taper at the end and to be in resilient contact engagement with the shaft, for example, in such a manner that external pressure reinforces the sealing action. With such an embodiment, internal pressure can be readily discharged from the encapsulated region by a springing-back action, while dirt and dust cannot be introduced. The lip seal must in this instance have a precisely balanced pretensioning in order to permit "breathing" between the encapsulated region and outer environment but also to ensure the sealing function. In this instance, particularly the extending inner grooves or "channels" in cooperation with the lip seal naturally enable the aeration and venting of the bearing seat.

In this context, another advantageous embodiment involves the inner grooves being orientated axially or parallel with respect to the shaft axis. Reliable aeration and venting of the encapsulated region is thereby achieved, in particular with powerful lifting movements of the sleeve bellows. This is further amplified by an embodiment in which the inner grooves are advantageously constructed at the end side so as to extend into the sealing lip region.

Another advantageous embodiment in the context of simple production ability involves the saw-tooth-like projections or ribs being orientated at right-angles with respect to the shaft axis.

Another advantageous embodiment involves the saw-tooth-like projections or ribs being constructed so as to be interrupted transversely relative to their path, that is, with projections or ribs which extend perpendicularly with respect to the shaft axis, transversely relative to the peripheral direction, and the interruptions of two projections or ribs which are located beside each other being arranged offset with respect to each other. There is consequently produced a labyrinth-like arrangement through which, even in the event of rotation movements, no grease can be discharged in the direction of the sleeve end.

Another advantageous embodiment involves the saw-tooth-like projections or ribs being constructed so as to face the coupling side, where applicable also being constructed so as to be inclined. This supports the sealing and grease-repellent action.

Good ability to be removed from the mold during production by an injection-molding method is achieved by another advantageous embodiment, which involves the coupling-side flank of the saw-tooth-like projections or ribs being inclined at an angle of from 75 to 95° with respect to the shaft axis and the end-side flank being inclined at an angle of from 110 to 140°.

In this regard, there has been found in practical tests an advantageous embodiment which involves the coupling-side flank being inclined at an angle of 86° with respect to the shaft axis and the end-side flank being inclined at an angle of 135°. Consequently, the inner tool can be readily and safely removed during injection-molding.

The embodiment of the labyrinth-like seal according to the invention is decisive for lubricant grease, which could reach the lip seal as a result of the lifting and rotation movement, to be kept away from the seat of the rotary joint coupling.

The inclination and/or angular flank orientation of the saw-tooth-like projections or ribs enables easier and deformation-free release from the mold from an injection-molding tool. Such an embodiment further enables the tooth shape with respect to the process of injection-molding to be better configured and enables a simple and cost-effective construction of the injection-molding molds.

Another advantageous embodiment involves the sealing sleeve being flanged to the outer periphery of the outer joint member at the end having the larger diameter and, at the end having the smaller diameter, being clamped on the shaft with a clamping ring which is placed in the first portion from the outer side. A secure fixing is thereby obtained at both ends, wherein in particular the end having the smaller diameter is reliably secured with simple clamping means and nonetheless retains its venting ability as a result of the longitudinal channels.

On the whole, the solution according to the invention has advantages in that an integrated labyrinth-like seal is provided by means of which a discharge of lubricant grease is prevented, in that, as a result of the aeration and venting by means of the inner grooves and lip seal, thinner wall thicknesses can be achieved, in that a lower article weight is present and lower costs are incurred during production and in that no expansion deformations of the rolling bellows occur during lifting and angular movements. As a result of the aeration and venting, contact with other components and consequently friction is further prevented, whereby the service-life is significantly increased.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
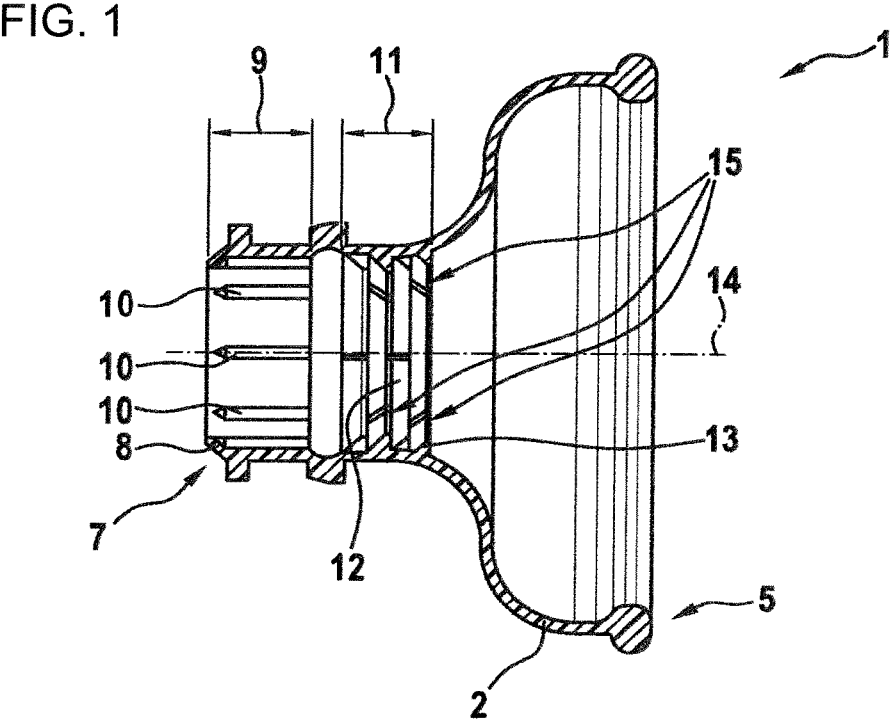
FIG. 1 shows a sealing sleeve according to the invention.

FIG. 1 shows a sealing sleeve 1 according to the invention in the form of a rolling bellows 2 which can be moved in a stroke and angular manner for sealing a rotary joint coupling 3 of a rotating shaft 4, wherein the sealing sleeve 1 is connected in a sealing manner with the end 5 thereof having the larger diameter to the outer joint member 6 and with the end 7 having the smaller diameter to the shaft 4. The rotary joint coupling 3, shaft 4 and outer joint member 6 can be seen in the overview of FIGS. 1 to 4.

The sealing sleeve 1 is shown inter alia in FIG. 1 and has at the end 7 a smaller diameter. Starting from this end, the sealing sleeve includes:

a lip seal 8 which lies in contact engagement with the periphery of the shaft;

a first section 9 which adjoins the lip seal 8 at the coupling end and which lies in contact engagement with the shaft and which is provided with inner grooves 10 which are arranged so as to be distributed over the inner periphery and which are open in the direction toward the shaft 4; and, a second section 11 which adjoins the first section 9 at the coupling end and which has sawtooth-like projections or ribs 12 which extend on the inner periphery thereof and which are orientated toward the shaft 4 and whose tips 13 are in contact engagement with the outer side of the shaft or the shaft periphery.

Figure 2A:
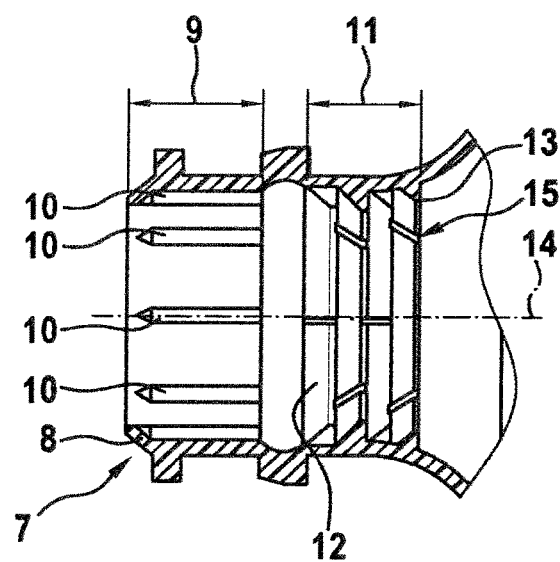
FIG. 2A is a further enlarged cutaway view of the end of the sealing sleeve having a smaller diameter according to FIG. 1.

As can be seen in FIGS. 1 and 2A, the lip seal 8 tapers at the end side and is in resilient contact engagement with the shaft 4. The inner grooves 10 are orientated axially or parallel with the sleeve axis or shaft axis 14 and are configured to extend into the sealing lip region.

The sawtooth-like projections or ribs 12 are orientated at right-angles with respect to the shaft axis 14 and constructed so as to be interrupted transversely relative to the course thereof, that is, in this instance, transversely relative to the peripheral direction, wherein the interruptions 15 of each two projections or ribs, which are located one next to the other, are arranged so as to be offset with respect to each other.

Figure 2B:
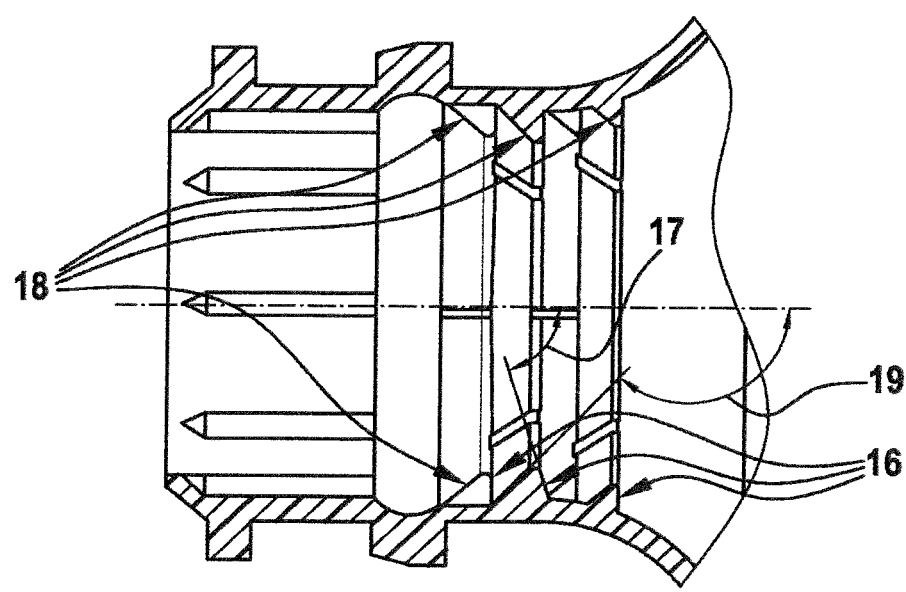
FIG. 2B is a further enlarged cutaway view of FIG. 2A with illustrated flank angles of the sawtooth-shaped projections or ribs.

In addition, as shown in FIG. 2B, the sawtooth-like projections or ribs 12 are configured to face the coupling side and have a coupling-side flank 16 which is inclined at an angle 17 of 86° with respect to the shaft axis 14, while the end-side flank 18 is inclined at an angle 19 of 135° with respect to the shaft axis 14.

Figure 3A:
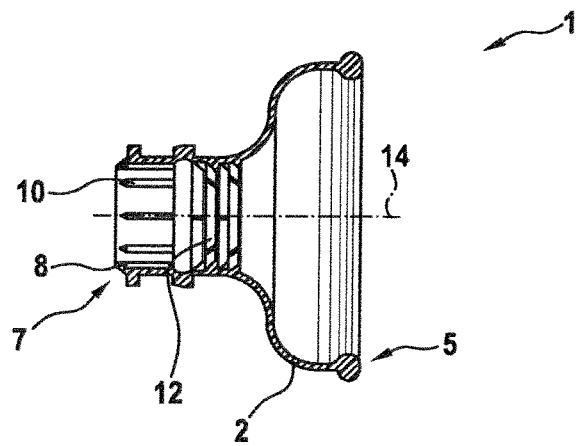
FIGS. 3A and 3B show a rotary joint coupling and a sealing sleeve according to the invention, separately prior to their assembly; and, FIG. 4 shows a rotary joint coupling with an incorporated sealing sleeve according to the invention.
Figure 3B:
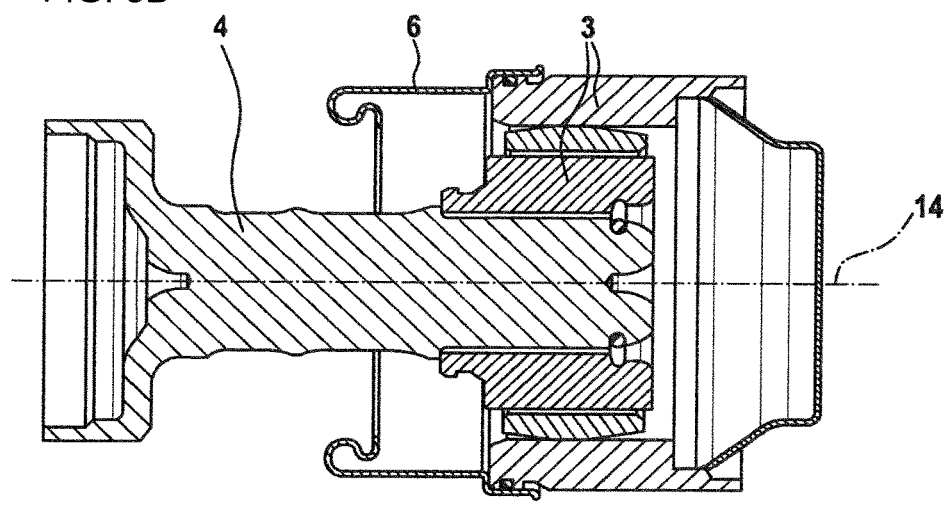

FIGS. 3A and 3B show a rotary joint coupling and a sealing sleeve according to the invention for clarification, in each case separately prior to the assembly thereof, that is, in FIG. 3B, a rotary joint coupling 3 having a shaft 4 and an outer joint member 6 without the sealing sleeve 1 inserted and, in FIG. 3A, the associated sealing sleeve 1.

Figure 4:
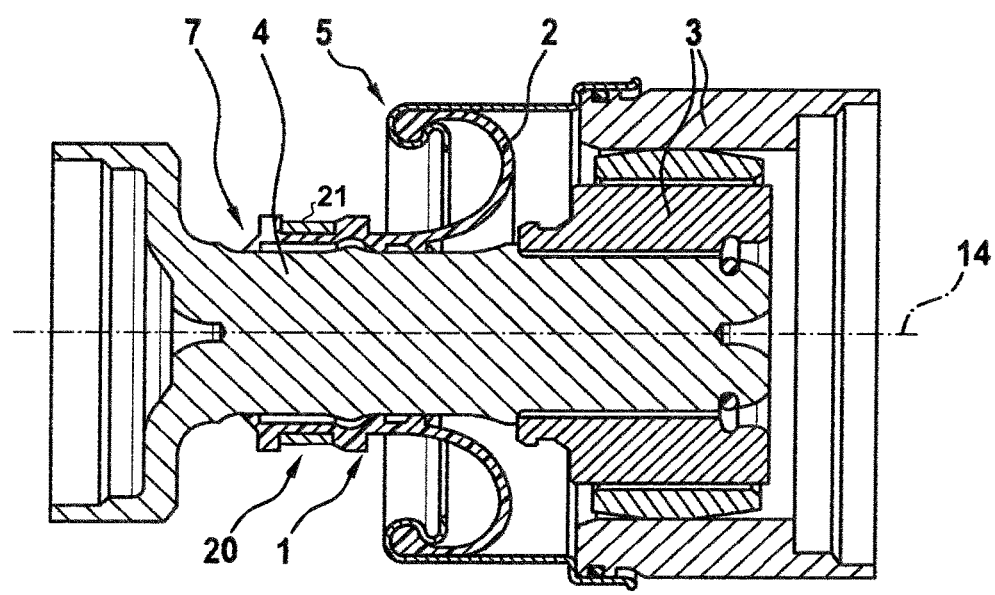

FIG. 4 shows a rotary joint coupling with the sealing sleeve 1 according to the invention inserted, wherein the sealing sleeve is inverted for installation and at the end 5 thereof having the larger diameter is flanged to the outer periphery of the outer joint member 6 and, at the end 7 thereof having the smaller diameter, the sealing sleeve is clamped to the shaft 4. The sealing sleeve has a clamping ring groove 20, which is formed in the first section 9, for a clamping ring 21 which is fitted from the outside.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the description)
1 Sealing sleeve
2 Rolling bellows
3 Rotary joint coupling
4 Shaft
5 End of the sealing sleeve having a larger diameter
6 Outer joint member
7 End of the sealing sleeve having a smaller diameter
8 Lip seal
9 First section
10 Inner groove
11 Second section
12 Projection or rib
13 Tip of the projection or rib
14 Shaft axis
15 Interruption of the projection or rib
16 Coupling-side flank
17 Angle of the coupling-side flank
18 End-side flank
19 Angle of the end-side flank
20 Clamping ring groove
21 Clamping ring

What is claimed is:
1. A sealing sleeve in the form of a stroke-movable and angle-movable rolling bellows for sealing off a shaft defining a longitudinal axis and rotating in a rotary joint coupling having a joint outer part and a coupling end facing toward said sealing sleeve, the sealing sleeve encapsulating the rotary joint to define an encapsulated region, the shaft having an annular outer peripheral surface and the sealing sleeve comprising:
  a first end having a first diameter and a second end having a second diameter greater than said first diameter;
  said second end being connected seal tight with the joint outer part and said first end being connected seal tight with the shaft;
  starting from said first end and continuing to said second end, said sealing sleeve further including:
  an annular lip seal in resilient contact engagement with the outer peripheral surface of the shaft whereat said lip seal defines a sealing lip region;
  said lip seal being configured to have a springing-back action in response to internal pressure discharged from the encapsulated region;
  a first section at the coupling end and said first section extending from said lip seal and being in contact engagement with the peripheral surface of the shaft;
  said first section having an inner peripheral surface in contact engagement with said peripheral surface of said shaft and a plurality of inner grooves formed in and distributed over said inner peripheral surface forming a corresponding number of channels with said peripheral surface of said shaft extending parallel to said longitudinal axis;
  a second section extending from said first section at the coupling end and communicating directly with said channels;
  said second section having an inner peripheral surface and a plurality of sawtooth-shaped rib projections aligned toward the shaft transversely to said longitudinal axis and disposed one behind the other when viewed in a direction along said longitudinal axis to provide a labyrinth seal which prevents a discharge of grease from the encapsulated rotary joint;
  said sawtooth-shaped rib projections defining said inner peripheral surface of said second section;
  said sawtooth-shaped rib projections having respective sawtooth tips in contact engagement with said outer peripheral surface of said shaft in respective planes transverse to said longitudinal axis within said second section;
  each of said sawtooth-shaped projections having interruptions formed thereon transversely to the course thereof;
  the interruptions of each two mutually adjacent ones of said sawtooth-shaped projections being staggered with respect to each other so as to cause said sawtooth-shaped projections to conjointly define said labyrinth seal to prevent a discharge of grease from within said first and second sections; and,
  said channels running parallel to said longitudinal axis and extending directly and uninterruptedly from said second section through said first section to said sealing lip region for aerating and venting the rotary joint encapsulated by the sealing sleeve.

2. The sealing sleeve of claim 1, wherein said lip seal is configured to be tapered down toward said shaft.

3. The sealing sleeve of claim 1, wherein the shaft defines a shaft axis; and, said sawtooth-shaped rib projections are aligned at right angles to the shaft axis.

4. The sealing sleeve of claim 1, wherein said sawtooth-shaped rib projections are configured to be directed toward said coupling end.

5. The sealing sleeve of claim 4, wherein said sawtooth-shaped rib projections have respective flanks facing toward the coupling end and disposed at an angle with respect to the longitudinal axis of said shaft lying in a range of 75° to 95° and said sawtooth-shaped rib projections have respective flanks facing away from said coupling end and disposed at an angle with respect to said longitudinal axis of said shaft lying in a range of 110° to 140°.

6. The sealing sleeve of claim 5, wherein said flanks facing toward the coupling end are inclined with respect to said longitudinal axis of said shaft at an angle of 86° and said flanks facing away from said coupling end are inclined with respect to said longitudinal axis of said shaft at an angle of 135°.

7. The sealing sleeve of claim 1, further comprising:

a clamp ring;

said joint outer part having an outer periphery and said second end of said sealing sleeve being flanged into said outer periphery; and, said first section defining an outer surface and having a clamp ring groove formed in said outer surface for accommodating said clamp ring therein for clamping the sealing sleeve onto said shaft.

\* \* \* \* \*